W. J. McMILLAN.
MEASURING AND REGISTERING FAUCET.
APPLICATION FILED APR. 29, 1909.

950,948.

Patented Mar. 1, 1910.
3 SHEETS—SHEET 1.

Witnesses
Inventor
W. J. McMillan

W. J. McMILLAN.
MEASURING AND REGISTERING FAUCET.
APPLICATION FILED APR. 29, 1909.

950,948.

Patented Mar. 1, 1910.
3 SHEETS—SHEET 2.

Witnesses
C. H. Griesbauer

Inventor
W. J. McMillan
by H. B. Willson & Co.
Attorneys

W. J. McMILLAN.
MEASURING AND REGISTERING FAUCET.
APPLICATION FILED APR. 29, 1909.
950,948.
Patented Mar. 1, 1910.
3 SHEETS—SHEET 3.
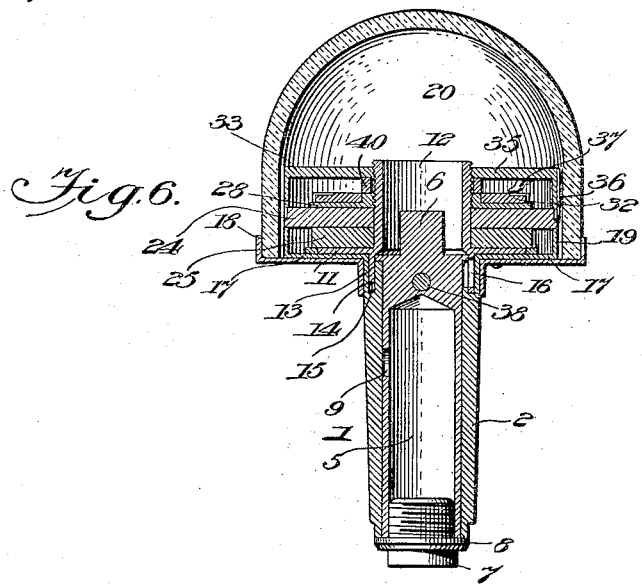
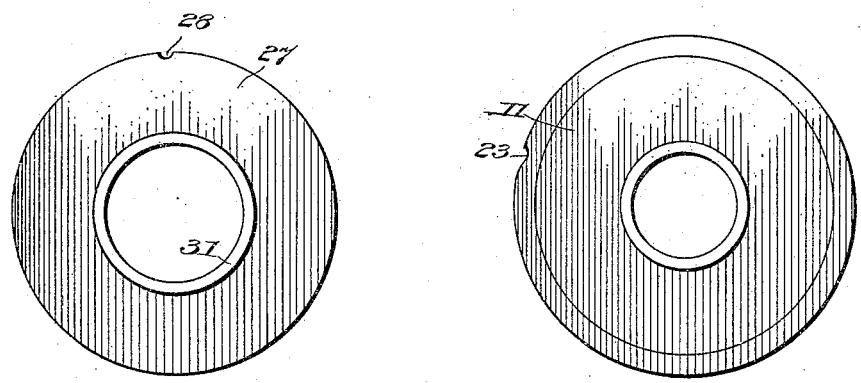
Witnesses
C. Clewer
C. H. Griesbauer.
Inventor
W. J. McMillan
by H. B. Willson & Co.
Attorneys

UNITED STATES PATENT OFFICE.

WILLIAM JAMES McMILLAN, OF LOS ANGELES, CALIFORNIA.

MEASURING AND REGISTERING FAUCET.

950,948.

Specification of Letters Patent. Patented Mar. 1, 1910.

Application filed April 29, 1909. Serial No. 492,947.

*To all whom it may concern:*

Be it known that I, WILLIAM JAMES MC-MILLAN, a citizen of the United States, residing at Los Angeles, in the county of Los Angeles and State of California, have invented certain new and useful Improvements in Measuring and Registering Faucets; and I do declare the following to be a full, clear, and exact description of the invention, such as will enable others skilled in the art to which it appertains to make and use the same.

This invention relates to improvements in measuring and registering faucets.

The object of the invention is to provide a faucet of this character having a valve plug in the form of a receptacle adapted to contain a given amount of liquid, and having means whereby each discharge of the contents of the receptacle is registered, and means whereby a total record of the amount of liquid drawn is also recorded.

With the foregoing and other objects in view, the invention consists of certain novel features of construction, combination and arrangement of parts, as will be more fully described and particularly pointed out in the appended claim.

Figure 1:
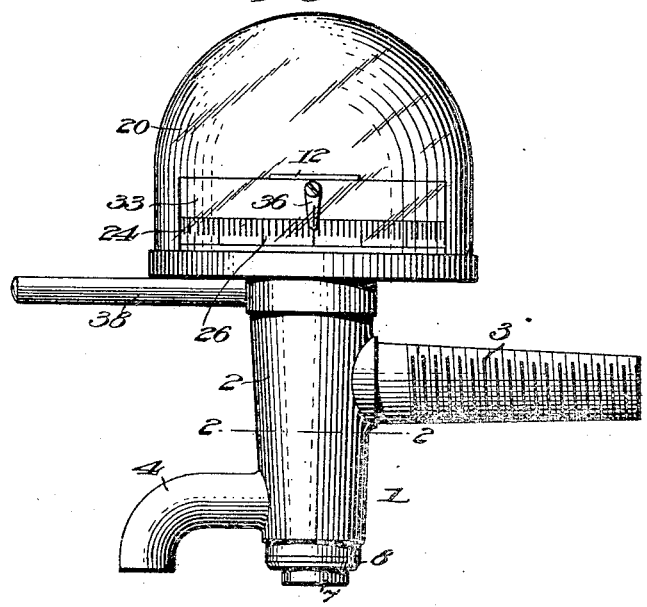
Figure 2:
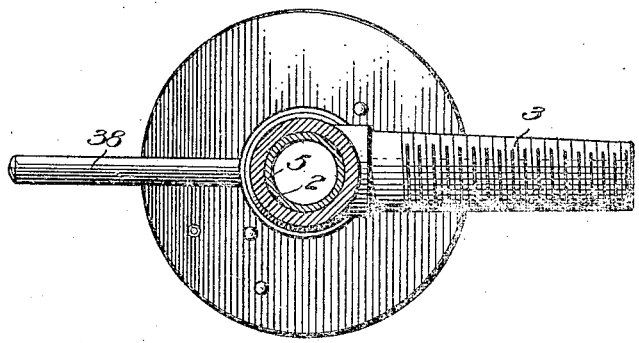
Figure 3:
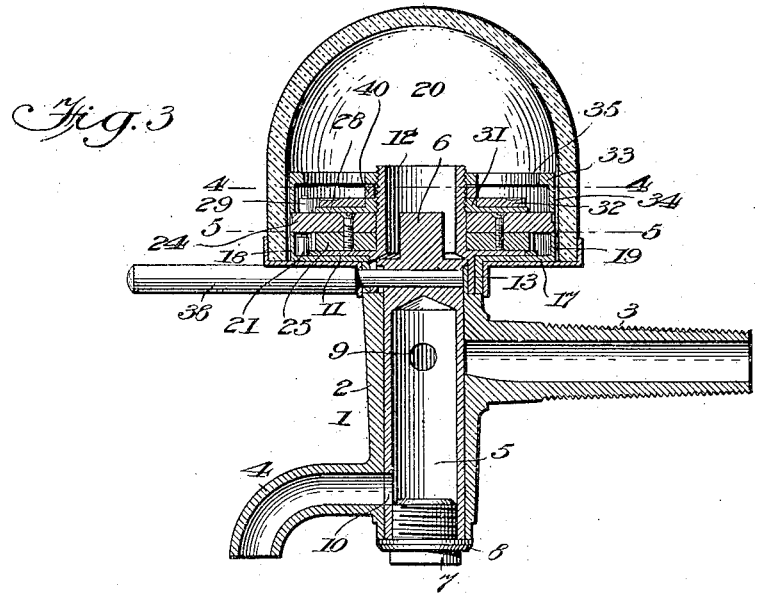
Figure 4:
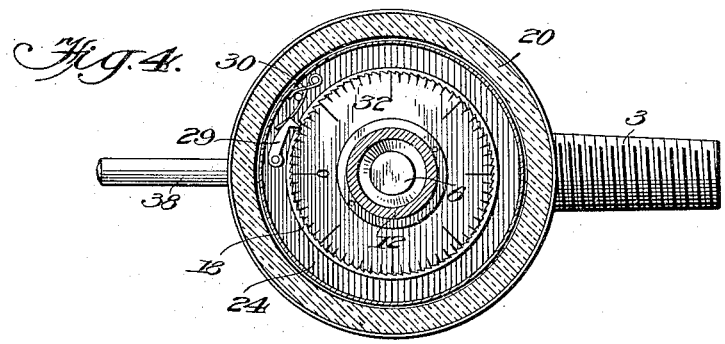
Figure 5:
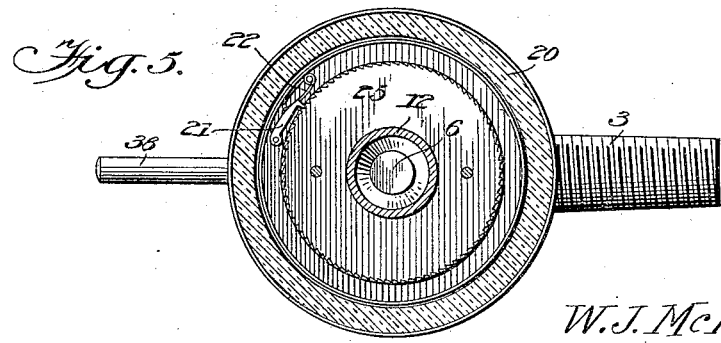

In the accompanying drawings, Figure 1 is a side view of a measuring and registering faucet constructed in accordance with the invention; Fig. 2 is a horizontal sectional view on the line 2—2 of Fig. 1; Fig. 3 is a central vertical section on the line 3—3 of Fig. 2; Fig. 4 is a horizontal section on the line 4—4 of Fig. 3; showing the total registering disk and its operating pawl in plan view; Fig. 5 is a similar view on the line 5—5 of Fig. 3, showing in plan view the gear and pawl for actuating the primary registering disk; Fig. 6 is a vertical sectional view, taken at right angles to Fig. 3; Fig. 7 is a detail plan view of the notched disk supporting plate; Fig. 8 is a similar view of the notched pawl holding plate of the total registering disk.

Referring more particularly to the drawings, 1 denotes the faucet which consists of a tubular body portion 2, from one side of which, adjacent to its upper end, projects a threaded attaching shank 3, by means of which the faucet may be secured to a barrel or cask. On the opposite side of the body 2, adjacent to its lower end is arranged a discharge spout 4. In thus arranging the shank 3 and the spout 4, it will be understood that the liquid is admitted to the body portion of the faucet near its upper end and is discharged therefrom near its lower end.

Mounted to turn in the body portion 2 of the faucet is a hollow plug 5, the upper end of which is closed by an integrally formed upwardly projecting valve stem 6, while the lower end is closed by a removable stopper 7 having an annular flange 8 which engages the lower edge of the body portion 2 and holds the plug in operative position therein. The plug 5 may be of any suitable size and is intended as a unit of measure whereby the amount of liquid drawn each time the faucet is turned on is known. In one side of the plug 5, adjacent to its upper end, is an inlet port 9 which, when the plug is turned to proper position, will communicate with the tubular shank 3 thereby permitting a liquid from the container to flow into the hollow plug. In the lower portion of the plug in a plane at right angles to the port 9 is arranged a discharge port 10 which, when the plug is turned in the proper direction will communicate with the discharge spout 4 and thus permit the liquid contained in the plug to pass out. By arranging the ports 9 and 10 as described, one of the same will be in closed position when the other is in open position, or in other words, when the inlet port 9 is in communication with the spout 4, the discharge port 10 will be closed by the adjacent walls of the body portion 2 and when the discharge port 10 is in line with the spout 4, the inlet port will be out of line with the shank and closed by the adjacent wall of the body portion 2.

In connection with the faucet, I employ a registering mechanism consisting of a supporting plate 11 mounted to turn on the upper end of the plug 5. The plate 11 is provided with a centrally disposed aperture, surrounded by an upwardly projecting exteriorly threaded nipple 12 into which the valve stem 6 projects. The plate 11 is also provided with a downwardly projecting annular flange 13 which loosely engages the upper end of the valve plug and fits over the reduced upper end of the body portion 2 of the valve. The flange 13 is provided in its lower edge on one side with a notch 14 which engages a stop pin 15 arranged in the shoulder formed by the upper reduced portion of the body of the valve, thereby locking the plate against movement on the upper end of the body portion. The reduced upper end of the body portion 2 is cut-away or recessed on one side and the flange 13 is provided with a corresponding slot 16, the purpose of which will hereinafter appear.

On the flange 13 of the plate 11 is mounted to turn a case supporting plate 17 having on its upper side, adjacent to its outer edge, upwardly projecting annular flanges 18 and 19 which are spaced apart to form an annular groove or channel to receive the lower end of a case 20 which is provided to inclose the registering mechanism, said case 20 being preferably formed of glass. On the upper side of the plate 17 between the inner flange 18 and the adjacent edge of the plate 11 which rests upon the plate 17 is a pivoted pawl 21 which is held in engagement with the edge of the plate 11 by a spring 22. In the edge of the plate 11 is formed a notch 23, the purpose of which will be hereinafter described.

Loosely mounted on the nipple 12 and resting on the supporting plate 11 is a combined gear and primary registering disk 24, the upper portion of which projects beyond the toothed edge of the lower or gear portion 25 and on the periphery of said projecting edge is arranged a series of indicating notches or marks 26. When the registering disk 24 is in position on the nipple 12 and supporting plate 11, the teeth of the gear portion 25 will be in position to be engaged by the pawl 21, each time the same is brought opposite to the notch 23 in the edge of the plate 11, for the purpose of turning the registering disk the distance of one tooth each time the valved plug is turned to discharge the liquid therefrom. The notch 23 is arranged in the plate 11 in such position that the pawl will be brought opposite the notch about or just before the time the discharge port in the plug is brought opposite to the spout in the faucet, so that before the turning operation of the plug is entirely completed, the pawl will enter the notch 23 and thus engage the gear portion 25 of the recording disk and move said disk to the distance of one tooth, thus indicating that one more plug full of liquid has been discharged from the container. When the pawl 21 is not in engagement with the notch, the edge of the plate 11 holds the pawl out of engagement with the gear portion of the recording disk.

Screwed onto the threaded upper portion of the nipple 12 and engaging the upper side of the primary registering disk 24 is a pawl holding plate 27 having in its edge a notch 28, the purpose of which will be hereinafter described. On the upper side of the primary recording disk, adjacent to its outer edge is a pawl 29, said pawl being held in engagement with the edge of the disk by a spring 30. The plate 27 is provided with a central upwardly projecting annular flange 31 and on said plate and flange is loosely mounted a total recording disk 32, said disk having on its outer edge a series of ratchet teeth which are adapted to be engaged by the pawl 29 when the latter is brought opposite to the notch in the holding plate 27, so that when the primary registering disk has made a complete revolution and the pawl 29 has been carried entirely around the edge of the plate 27, the spring 30 will force the pawl into the notch 28 and into engagement with the ratchet teeth on the edge of the total registering disk 32 whereby the pawl will turn the disk to the distance of one tooth before being again forced out of the notch and held out of engagement with the teeth on the disk by the edge of the holding plate 27. On the upper side of the total recording disk, adjacent to its outer edge, is arranged a series of graduations which indicate the number of revolutions made by the primary recording disk thus indicating the quantity of liquid drawn from the container through the measuring mechanism of the faucet hereinbefore described.

Screwed onto the upper end of the nipple 12 is a retaining plate 33 having on its outer edge a downwardly projecting flange 34 which engages the upper edge of the primary recording disk, as shown. The plate 33 is provided with segmental openings 35, through which the indicating marks on the total recording disk may be observed through the glass protecting case.

On the flanged outer edge of the retaining plate 33 is formed a spring detent 36 which bears against the marked or notched edge of the primary registering disk and retards the movement of the same, thus preventing the disk from being casually revolved or turned to a greater distance than the space of one tooth on the gear portion thereof. Secured to the underside of the retaining plate 33 is a retarding spring or detent 37 which bears upon the upper side of the total recording disk 32 and serves to prevent said disk from being casually rotated or turned to a distance greater than the space of one tooth.

The valved plug 5 and the case supporting plate 17 which carries the pawl 21 are simultaneously moved to open and close the faucet by means of a laterally projecting stem or handle 38 having a reduced inner end which is inserted through an aperture in the downwardly projecting flange of the plate 17 and into a transversely disposed passage formed in the upper end of the valve plug. The reduced end of the stem also passes through the slotted portion of the flange 13 of the supporting plate 11 and through the notched portion of the reduced upper end of the faucet body so that in the movement of the handle, said supporting plate 11 will not be turned. The opposite ends of the notch in the upper portion of the faucet body, is engaged by the stem or handle 38 in its movement to open or close the plug and thus limits the movement of the valve plug and plate 11. Between the flange of the pawl holding plate 27 and the lower side of the retaining plate 33, is arranged a spacing ring 40 which prevents the flange 34 on the retaining plate from being forced into too tight engagement with the upper side of the primary recording disk and thus interfering with the movement of the latter.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

A registering mechanism for faucets having hollow plugs comprising a primary registering mechanism including a combined registering disk and operating gear, a pawl operated by the movement of the plug of the faucet, a plate adapted to normally hold said pawl out of engagement with the gear of said primary registering disk, said plate having formed therein a notch to permit the pawl to engage said gear and move the same and the registering disk one notch at each movement of the valve, a total registering mechanism operated by said primary recording mechanism, said total mechanism comprising a registering disk having on its outer edge a series of ratchet teeth, a pawl carried by said primary registering disk, a pawl holding plate adapted to normally hold said pawl out of engagement with the teeth of said total registering disk, said plate having formed therein a notch whereby the pawl is permitted to engage said ratchet teeth and operate said total registering disk the distance of one tooth at each complete revolution of the primary registering disk, means to prevent the casual operating of said registering disk, and a handle operatively engaged with said valve plug and primary registering mechanism whereby the same are simultaneously operated.

In testimony whereof I have hereunto set my hand in presence of two subscribing witnesses.

WILLIAM JAMES McMILLAN.

Witnesses:
C. SANDGREN,
W. E. PEIRCE.